(12) United States Patent
Dahle et al.

(10) Patent No.: US 10,660,473 B2
(45) Date of Patent: May 26, 2020

(54) SYSTEM, DEVICE AND METHOD FOR CONTROLLING CONVECTIVE HEATING OF A GRIDDLE

(71) Applicant: North Atlantic Imports, LLC, North Logan, UT (US)

(72) Inventors: Roger Dahle, Providence, UT (US); Ryan D. Sharp, American Fork, UT (US)

(73) Assignee: North Atlantic Imports, LLC, Logan, UT (US)

( * ) Notice: Subject to any disclaimer, the term of this patent is extended or adjusted under 35 U.S.C. 154(b) by 426 days.

(21) Appl. No.: 15/582,682

(22) Filed: Apr. 29, 2017

(65) Prior Publication Data

US 2017/0332839 A1 Nov. 23, 2017

Related U.S. Application Data

(60) Provisional application No. 62/331,673, filed on May 4, 2016.

(51) Int. Cl.
| | | |
|---|---|---|
| A47J 37/06 | (2006.01) | |
| F24C 15/32 | (2006.01) | |
| H05B 6/64 | (2006.01) | |
| A21B 1/24 | (2006.01) | |
| F24C 3/14 | (2006.01) | |
| F24C 15/12 | (2006.01) | |

(52) U.S. Cl.
CPC ......... *A47J 37/0682* (2013.01); *F24C 15/322* (2013.01); *H05B 6/6473* (2013.01); *A21B 1/245* (2013.01); *F24C 3/14* (2013.01); *F24C 15/12* (2013.01)

(58) Field of Classification Search
CPC ..... A47J 37/0682; F24C 15/322; F24C 15/12; F24C 3/14; A21B 1/245; H05B 6/6473
See application file for complete search history.

(56) References Cited

U.S. PATENT DOCUMENTS

| | | |
|---|---|---|
| 1,201,138 A | 10/1916 | Bingham |
| 1,447,813 A | 3/1923 | Patrick |
| 4,715,356 A * | 12/1987 | Reynolds ............... F24C 3/067 |
| | | 126/214 R |
| 5,349,899 A | 9/1994 | Tominaga et al. |
| 5,676,043 A | 10/1997 | Best |
| 6,389,960 B1 | 5/2002 | Williams et al. |
| 7,348,519 B2 | 3/2008 | Federspiel et al. |
| D604,098 S | 11/2009 | Hamlin |
| D694,056 S | 11/2013 | Dahle |
| 9,119,500 B2 | 9/2015 | Hamlin |
| 2008/0223359 A1 | 9/2008 | Huang |
| 2010/0083949 A1 | 4/2010 | Lisheng |
| 2010/0199857 A1 | 8/2010 | Storiz et al. |
| 2014/0161952 A1 | 6/2014 | Sykes |

* cited by examiner

*Primary Examiner* — Alfred Basichas
(74) *Attorney, Agent, or Firm* — David L. Stott

(57) ABSTRACT

Devices, systems, and methods for maintaining convection heat within a heating region of a griddle and channeling the convection heat therefrom. The griddle includes a ribbing structure along its underside surface in a configuration that cooperates with the burners of a cooking station. Such ribbing structure allows a user to control the convective heating of the griddle as desired and channels the convective heat to a single side of the griddle, away from the user.

20 Claims, 5 Drawing Sheets

SYSTEM, DEVICE AND METHOD FOR CONTROLLING CONVECTIVE HEATING OF A GRIDDLE

CROSS-REFERENCE TO RELATED APPLICATIONS

This application claims the benefit of U.S. Provisional Application No. 62/331,673, filed May 4, 2016, the disclosure of which is hereby incorporated by reference in its entirety.

TECHNICAL FIELD

The present invention relates generally to gas heated outdoor cooking stations and, more specifically, the present invention relates to a griddle cooking station with controlled region heating and controlled convection heat flow.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

One problem with using a griddle directly on a grill or over flame burners is the control of the temperature of the griddle cooking surface when it is desired to only use a portion of the surface or when it is desired to have certain portions of the cooking surface a higher temperature than other portions. Another problem with using a griddle over flame burners is the convective heat from the flames moves around the entire periphery of the griddle, often times making it difficult to cook effectively or even somewhat dangerous if children are present due to the heat bellowing around the front of the griddle.

BRIEF SUMMARY OF THE INVENTION

The present invention is directed to devices, systems, and methods for maintaining convection heat within a heating region of a griddle and channeling and the convection heat therefrom. For example, in one embodiment, a cooking system is provided. The cooking system includes a frame, multiple burners, and a griddle. The frame extends with a front side, a rear side, a left side, and a right side, which each may extend between a lower portion and an upper portion of the frame. The multiple burners are coupled to and extend between the front side and the rear side of the frame. The griddle is sized to be suspended by the frame and to be positioned on the upper portion of the frame. The griddle includes a cooking surface and an underside surface, the underside surface extending to define a rectangular shape with a front end, a rear end, a left end, and a right end. Further, the griddle includes a front rib and multiple lateral ribs. The front rib extends along the front end of the underside surface, and the multiple lateral ribs extend along the underside surface from the front rib to the rear end of the underside surface. The multiple lateral ribs are spaced from each other so as to define multiple heating regions such that each heating region is defined between adjacently extending lateral ribs. Further, each of the heating regions include one of the multiple burners positioned below one of the multiple heating regions. With this arrangement, each of the lateral ribs extend downward from the underside surface a height so as to funnel convection heat from any one of the multiple burners toward the rear end of the underside surface of the griddle and from the rear side of the frame.

In one embodiment, the front rib substantially blocks convection heat from escaping from the front side of the frame. In another embodiment, the adjacently extending lateral ribs are sized to substantially prevent convection heat from moving over the adjacently extending lateral ribs and directly, convectively heating adjacent heating regions. In another embodiment, the adjacently extending lateral ribs are sized to substantially maintain convection heat between the adjacently extending lateral ribs to only convectively heat the corresponding heating region between the adjacently extending lateral ribs.

In another embodiment, the cooking surface of the griddle includes a trough configured to catch grease, the trough extending only along a rear end surface of the cooking surface. In another embodiment, the cooking surface of the griddle includes a trough configured to catch grease, the trough extending only along a rear end surface of the cooking surface and defining an opening at one end of the trough. In a further embodiment, the opening defined in the trough is configured to deposit grease within a vent box coupled to the frame, the vent box including venting for air intake to feed air to the multiple burners.

In another embodiment, the frame includes an air intake system configured to feed air to the multiple burners, the air intake system including at least one of a front vent along the front side of the frame, a left vent along the left side of the frame, and a right vent along a right side of the frame. In another embodiment, the front rib and the lateral ribs facilitate convection heat to be channeled to a rear side of the frame.

In accordance with another embodiment of the present invention, a griddle configured to control convection heat from one or more gas flame burners of a cooking station is provided. The griddle includes a cooking surface, an underside surface, a front rib, and multiple lateral ribs. The cooking surface includes a rectangular shape and is configured to face upward. The underside surface extends to generally correspond with the cooking surface, the underside surface facing in an opposite direction than the cooking surface, and the underside surface extending to define a periphery with a front end, a rear end, a left end, and a right end. The front rib includes a front rib height and is coupled to the front end of the underside surface such that the front rib extends longitudinally along the front end of the underside surface. The multiple lateral ribs each extend laterally relative to the front rib and extend along the underside surface from the front rib to the rear end of the underside surface. The multiple lateral ribs are spaced from each other so as to define multiple heating regions such that each heating region is defined between adjacently extending lateral ribs. The heating regions are each configured to be positioned above a gas flame burner. With this arrangement, each of the lateral ribs extend downward from the underside surface a lateral rib height such that the adjacently extending lateral ribs are configured to funnel the convection heat from the gas flame burner toward the rear end of the underside surface and away from a rear side of the cooking station.

In one embodiment, the front rib substantially blocks the convection heat from escaping a front side of the underside surface. In another embodiment, the adjacently extending lateral ribs are sized to substantially prevent convection heat from moving over the adjacently extending lateral ribs and directly, convectively heating adjacent heating regions. In another embodiment, the adjacently extending lateral ribs are sized to substantially maintain convection heat therebetween to only convectively heat the corresponding heating region between the adjacently extending lateral ribs.

In another embodiment, the cooking surface includes a trough configured to collect grease, the trough extending only along a rear end surface of the cooking surface, the trough defining a through hole configured to funnel grease therethrough. In another embodiment, the griddle further includes a splash guard that extends upward above a periphery of the cooking surface. In a further embodiment, the splash guard includes a hinge structure, the hinge structure configured to pivotably couple to a cover of the cooking station.

In accordance with another embodiment of the present invention, a method for selectively heating regions of a griddle with convection heat from one or more gas flame burners of an outdoor cooking station is provided. The method includes: turning on one or more gas burners of the outdoor cooking station such that the one or more gas burners are positioned below an underside surface of a griddle; and selectively heating specific regions of the griddle that correspond with the one or more gas burners turned on, the specific regions each defined by adjacently extending parallel ribs, the ribs extending laterally from a front rib toward a rear end of the underside surface of the griddle such that the front rib and the parallel ribs channel convection heat to flow between the adjacently extending parallel ribs toward the rear end of the griddle and away from the outdoor cooking station.

In one embodiment, the step of selectively heating includes selectively heating the specific regions with the parallel ribs substantially preventing convection heat from moving over the parallel ribs by the convection heat being drawn toward the rear end of the griddle. In another embodiment, the step of selectively heating includes blocking the convection heat from moving toward a front end of the underside of the griddle with a downward facing edge of the front rib resting on a frame of the outdoor cooking station to substantially block the convection heat from escaping out the front side of the cooking station. In still another embodiment, the step of selectively heating includes substantially preventing convection heat from moving over the parallel ribs by drawing the convection heat toward the rear end of the griddle with rear end openings, each rear end opening defined by oppositely positioned rear rib ends of the parallel ribs and the rear end of the underside surface of the griddle and a frame component of the outdoor cooking station, the parallel ribs positioned on the frame component.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
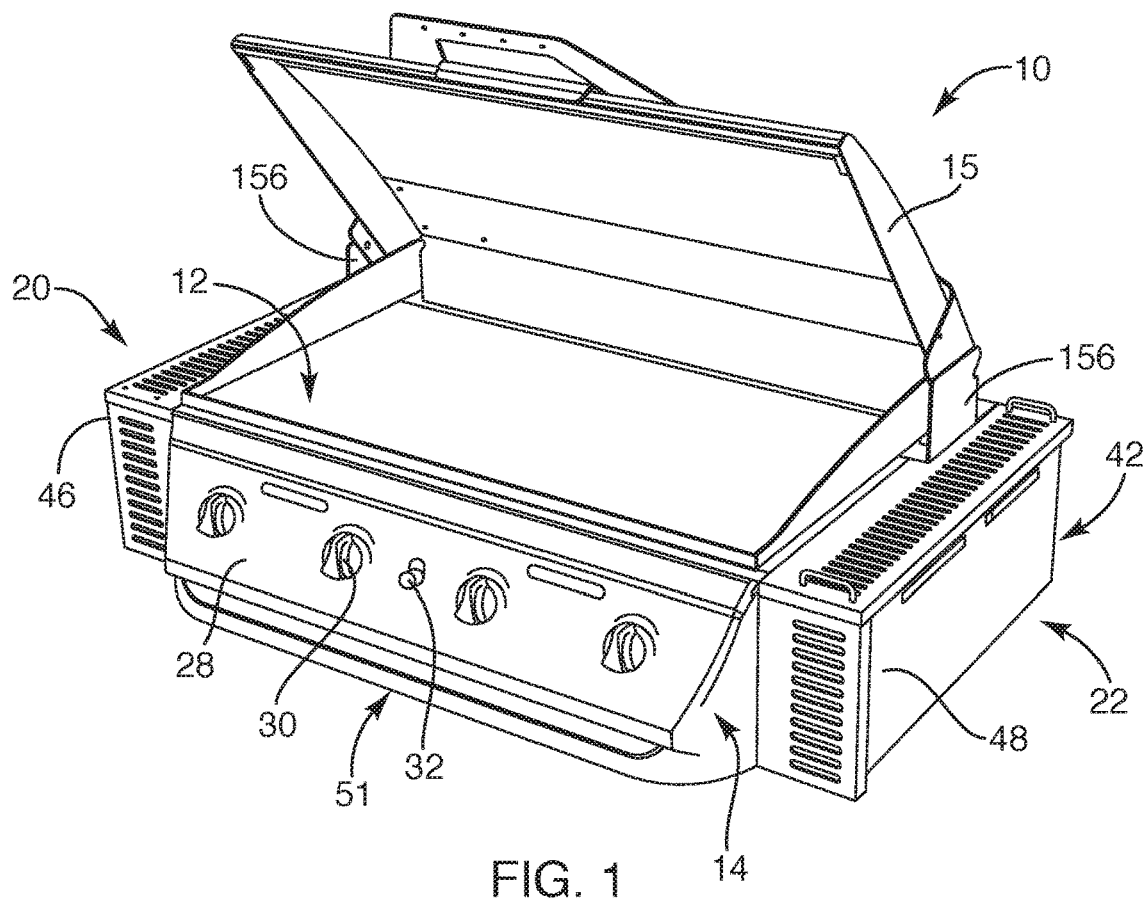
FIG. 1 is a perspective view of a cooking station with a griddle thereon, according to an embodiment of the present invention.

Referring to FIG. 1, a cooking station 10 sized and configured to support a griddle 12, is provided. The griddle 12 of the cooking station 10 may include structure for channeling and maintaining convection heat flow within selective heat regions of the griddle 12 (see FIGS. 6 and 6A). As depicted, in one embodiment, the cooking station 10 may include a frame 14 (FIG. 2) and components sized and configured to be employed as an insert for an outdoor kitchen that may be coupled to, for example, natural gas. In this embodiment, the griddle 12 may be configured to be removeably coupled to the frame 14 or removably integrated with the cooking station 10. In another embodiment, the cooking station 10 described herein may be a cooking station that is portable with, for example, leg components, caster wheels, and a propane gas tank (not shown), in which the griddle 12 may be removeably coupled and/or removably integrated to the frame 14 such that the griddle 12 is sized to integrate with the frame components. In another embodiment, the griddle 12 may be positioned to merely rest over a grill or frame in a free-supporting manner. In other words, the griddle 12 of the present invention may be employed with various types of cooking stations, i.e., insert or portable, so long as the cooking station is sized to support the griddle 12.

Figure 2:
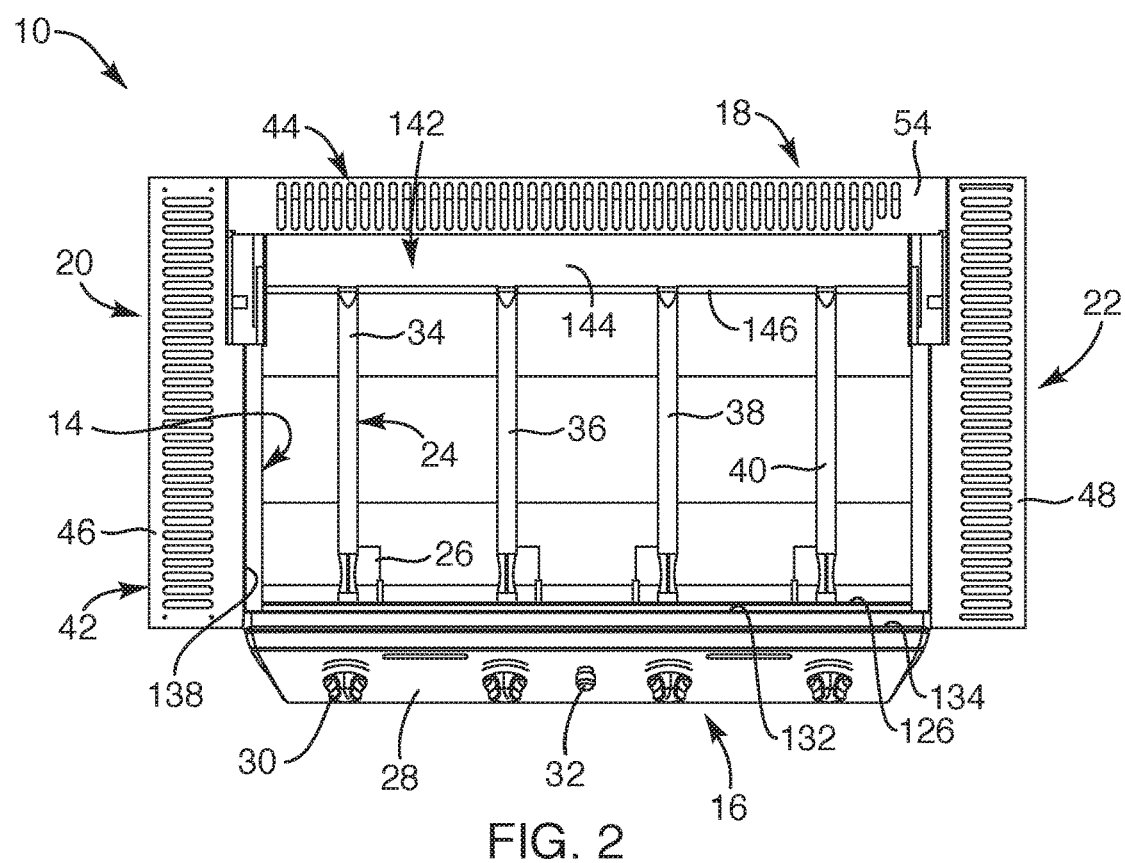
FIG. 2 is a top view of the cooking station without the griddle and a cover shown, depicting gas flame burners within a frame of the cooking station, according to another embodiment of the present invention.

With respect to FIGS. 1 and 2, as set forth, the cooking station 10 may include the frame 14 that may extend with various frame components. Such frame components may extend along a front side 16, a rear side 18, a left side 20, and a right side 22 of the frame 14 to form a housing and support structure for the various components of the cooking station 10. The various components for heating the cooking station 10 may be typical cooking station components with gas flame burners 24, as known to one of ordinary skill in the art. For example, the frame 14 may be coupled to and support multiple burners 24 each associated with igniter needles 26 or the like. The burners 24 may be operated and controlled from a front panel 28 coupled at the front side 16 of the frame 14. The front panel 28 may include burner knobs 30 and an igniter button 32, for example. The burner knobs 30 may be configured to control gas flow, via valves and tubing (not shown), through corresponding burners 24 by turning the burner knobs 30 to various open positions and a closed position. For example, turning the knob clockwise may increase the amount of gas provided through the burners 24 and turning the knob counter-clockwise may decrease gas flow until reaching a hard stop at the closed or off position. Each burner knob 30 may be associated with various valves and a manifold coupled to a fuel source (not shown), typically provided in open gas flame cooking stations, as known to one of ordinary skill in the art.

In one embodiment, the multiple burners 24 are coupled to the frame 14 and may extend between the front side 16 and the rear side 18 of the frame 14. For example, the multiple burners 24 may include a first burner 34, a second burner 36, a third burner 38, and a fourth burner 40, each of which may be elongated and tubular or the like. Each of the burners 24 may be evenly spaced relative to each other so that each burner 24 may be centered below a different heating region or heat zone of the griddle 12 (see FIG. 6), discussed in further detail hereafter.

In an embodiment relative to an insert type cooking station 10, as depicted, the cooking station 10 may include an air intake system 42 and an air out-take system 44, the air intake system 42 for ensuring air flow is fed to the burners 24 and the air out-take system 44 for venting convection heat from the rear side of the cooking station 10. For example, in one embodiment, the air intake system 42 may include a left vented duct 46 and a right vented duct 48 and a front vented duct 50. The left and right vented ducts 46, 48 may be box shaped with vents along a top wall and a front wall thereof, the top and front walls being exposed relative to, for example, counter-tops of an outdoor kitchen. Additional venting (not shown) along the left and right sides 20, 22 of the frame 14 (behind the left and right vented ducts 46, 48) may be provided for feeding air to the burners 24. The front vented duct 50 may be positioned below the front panel 28 for air flow therethrough, as depicted by arrow 52, as shown in FIG. 6A.

With respect to FIGS. 2 and 6A, the air out-take system 44, may include ribbing structure 50 of the griddle 12, discussed in further detail herein, and a rear vented duct 54 for channeling convection heat from below the griddle 12 and from the rear side of the cooking station 10. Such rear vented duct 54 may be box shaped and include venting defined in the top wall thereof.

In another embodiment, the cooking station 10 may be portable, in which venting may be employed on the left, right and front sides of frame panels (not shown) of the frame or such venting may not be necessary because the underside of the frame may be open to communicate air flow to the burners 24. In a portable cooking station embodiment, the air out-take system may be facilitated solely with the ribbing structure 50 of the griddle 12 and/or a rear portion of the griddle 12, in which the rear vented duct may not be included with the portable cooking station.

Figure 3:
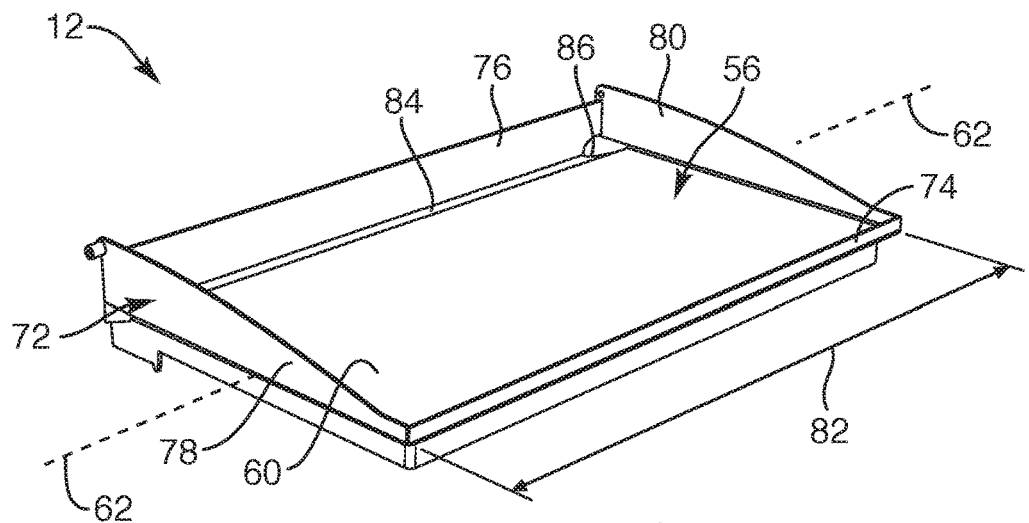
FIG. 3 is a perspective top view of the griddle, according to another embodiment of the present invention.
Figure 8:
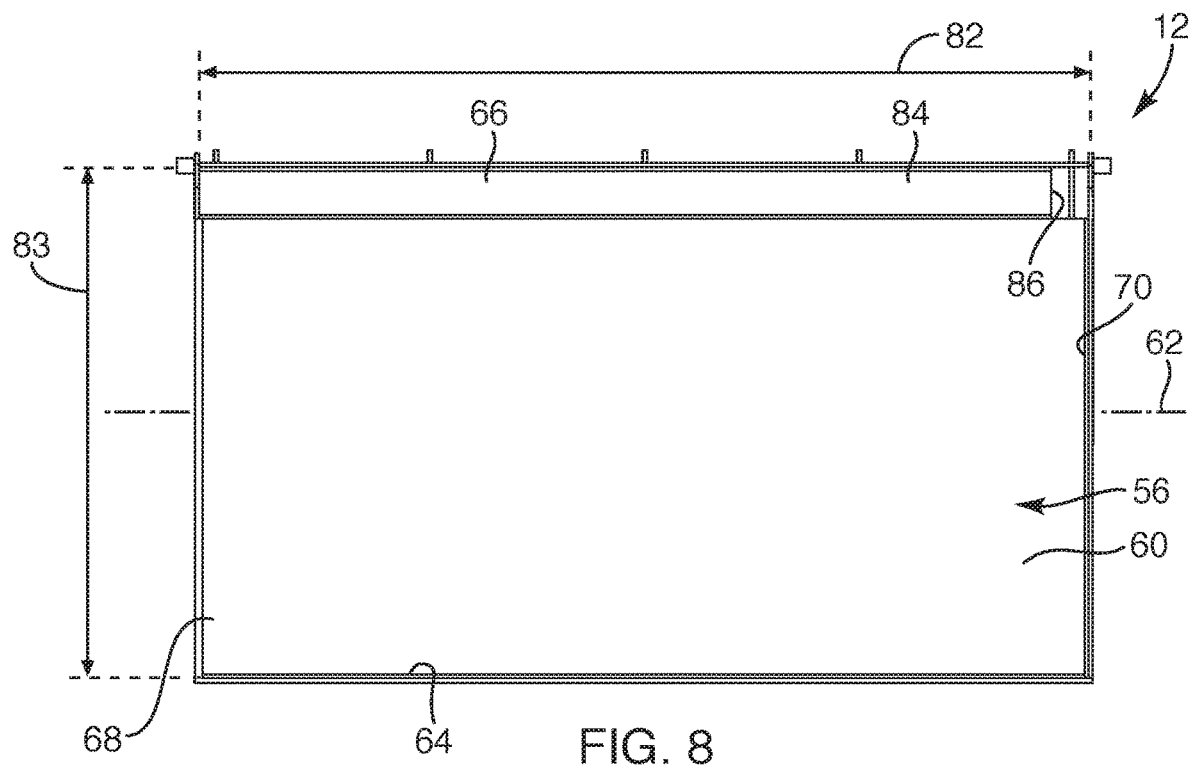
FIG. 8 is a top view of the griddle, depicting a trough and the lateral ribs extending beyond and under the trough at the rear end of the underside surface of the griddle, according to another embodiment of the present invention.

Now with reference to FIGS. 3, 4 and 8, the griddle 12 will now be described. The griddle 12 may include an upper surface 56 and an underside surface 58. In one embodiment, the upper surface 56 may include a flat cooking surface 60 extending over substantially all or a majority of the upper surface 56. The upper surface 56 may be elongated with a rectangular shape defining a longitudinal axis 62, the upper surface 56 extending to an upper front end 64, an upper rear end 66, an upper left end 68 and an upper right end 70. In one embodiment, the periphery of the upper surface 56 or each side may include a splash guard 72, such as a front splash guard 74, a rear splash guard 76, a left splash guard 78 and a right splash guard 80. The front and rear splash guards 74, 76 may be coupled to and extend along a length 82 of the upper front end 64 and the upper rear end 66, respectively, of the upper surface 56 of the griddle 12. Similarly, the left and right splash guards 78, 80 may be coupled to and extend along a width 83 of the upper left end 68 and the upper right end 70, respectively, of the upper surface 56 of the griddle 12. Each of the splash guards 72 may extend upward from their respective sides. The rear splash guard 76 may extend higher than the front splash guard 74 and the left and right splash guards 78, 80 may taper or slope downward in height from the rear to the front sides.

In one embodiment, the upper surface 56 may define a trough 84 extending along the upper rear end 66 of the upper surface 56. The trough 84 may be sized and configured to collect grease or other food byproducts being cooked on the griddle 12. The trough 84 may extend with a bend from the flat cooking surface 60 along the upper rear end 66. In one embodiment, the trough 84 may extend entirely along the length 82 and along the upper rear end 66 of the upper surface 56. Further, the trough 84 may extend only along the upper rear end 66 of the upper surface 56, without any other troughs extending along other sides of the cooking surface 60. In another embodiment, the trough 84 may include a through hole 86 along the length of the trough 84. For example, the trough 84 may define the through hole 86 at one end of the trough 84, such as adjacent a corner of the upper rear end 66 and upper right end 70 of the upper surface 56. Although not shown, under the through hole 86, a channel, such as a u-shaped channel, leading or extending to a grease cup may be positioned and removably secured below the through hole 86. Such channel and grease cup may be positioned within the right vented duct 48 and accessible from the top wall of the right vented duct 48 that may be pivotably openable (see FIG. 1). The grease cup may be readily removable for cleaning purposes and then re-positioned and secured. In another embodiment, the through hole 86 may be at or adjacent a mid-point along the length of the trough 84.

Figure 4:
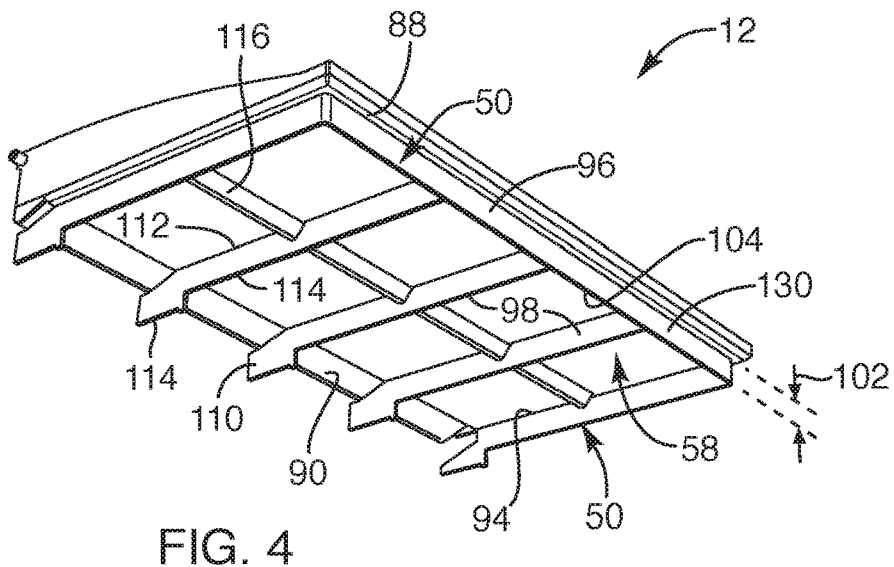
FIG. 4 is a perspective front-bottom view of the griddle, according to another embodiment of the present invention.
Figure 5:
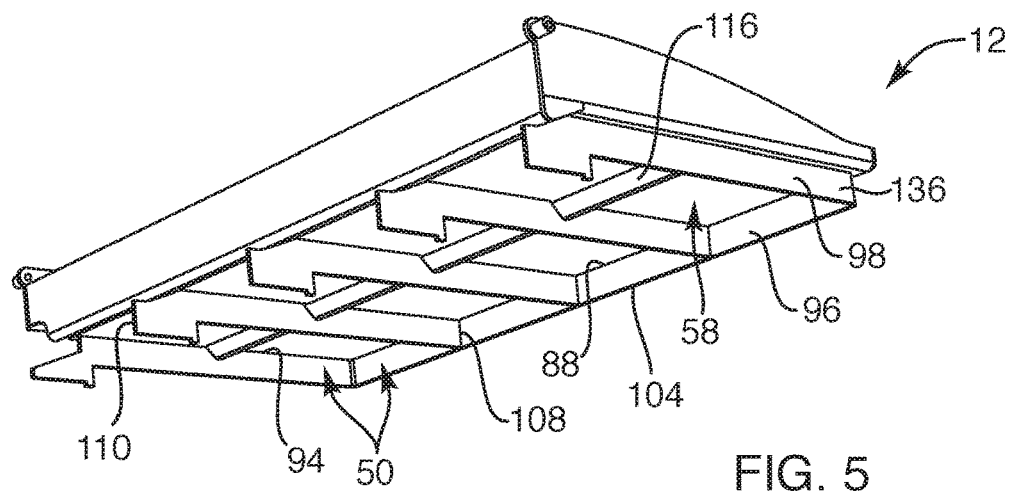
FIG. 5 is a perspective rear-bottom view of the griddle, according to another embodiment of the present invention.
Figure 7:
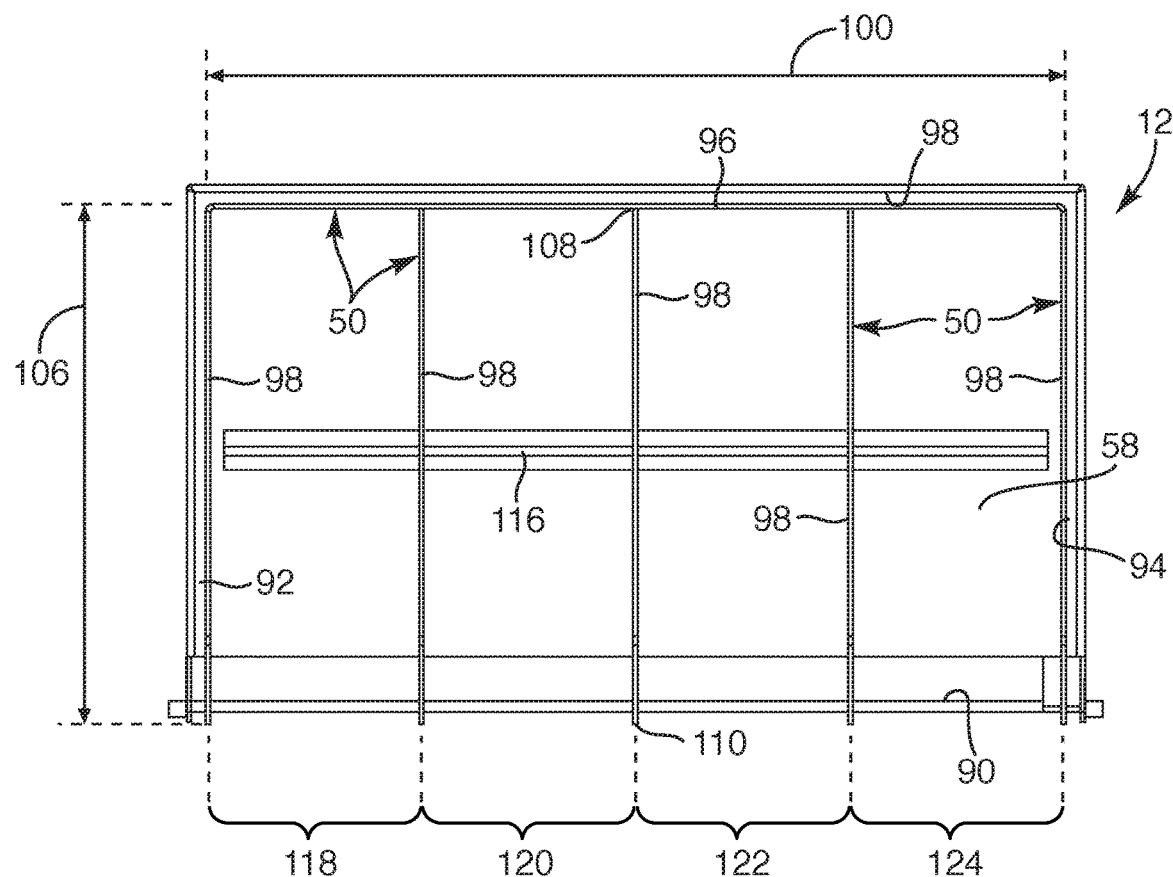
FIG. 7 is a bottom view of the griddle, depicting the lateral ribs and heating regions, according to another embodiment of the present invention.

Now with reference to FIGS. 4, 5 and 7, the underside surface 58 of the griddle 12 may also extend with a rectangular shape corresponding with the shape of the upper surface 56. Similar to the upper surface, the underside surface 58 may extend to a front end 88, a rear end 90, a left end 92 and a right end 94. The underside surface 58 may include the ribbing structure 50 or multiple ribs each being positioned and directly coupled to the underside surface 58 of the griddle 12 in pre-determined locations to define heating regions and channels for venting or channeling convection heat from the burners 24 (FIG. 2). For example, the multiple ribs 50 may include a front rib 96 and multiple lateral ribs 98. The front rib 96 may be elongated with a front rib length 100 that extends with a consistent height 102 and thickness. The front rib 96 may extend along the front end 88 of the underside surface 58. The front rib 96 may include a front lower edge 04 configured to be positioned to rest on a portion of the front side 16 of the frame 14 (see FIG. 2).

Each of the lateral ribs 98 may extend laterally relative to the front rib 96 such that the lateral ribs 98 may be positioned substantially perpendicular relative to the front rib 96 such that the lateral ribs 98 extend substantially parallel relative to each other. The lateral ribs 98 may be elongated with a lateral rib length 106 that extends between first and second ends 108, 110 with an upper edge 112 and a lower edge 114. The first end 108 of each lateral rib 98 may be positioned and secured directly against an inside surface of the front rib 96. The second end 110 may extend toward or adjacent to the rear end 90 of the underside surface 58. The upper edge 112 may be positioned and secured against the underside surface 58 with the upper edge 112 extending downward at an angle adjacent the second end 110 to account for the underside of the trough 84. The lower edge 114 of the lateral ribs 98, adjacent the second end 110, may be configured to rest on a portion of the rear side 18 of the frame 12 (FIG. 2). The lower edge 114 may extend from the first end 108 continuously and then step downward to a rear portion of the lower edge 114 sized and configured to rest on the frame 12. In another embodiment, the lower edge 114 of the lateral ribs 98 may angle downward from adjacent the first end 108 and then extend parallel and continuous with the underside surface 58 to the second end 110 of the lateral ribs 98.

In one embodiment, the underside surface 58 may also include one or more stabilizers 116. For example, the one or more stabilizers 116 may be elongated and extend between the left and right ends 92, 94 along the underside surface 58 of the griddle 12, for example, along a mid portion of the griddle 12. The one or more stabilizers 116 may be configured to stabilize the griddle 12 so as to substantially prevent warping upon the griddle 12 being over heated. Further, in addition to the front rib 96 and lateral ribs 98 serving as channel portions for channeling convective heat, the front rib 96 and lateral ribs 98 may also serve as stabilizers in substantially preventing the griddle from warping or partially warping.

Figure 6:
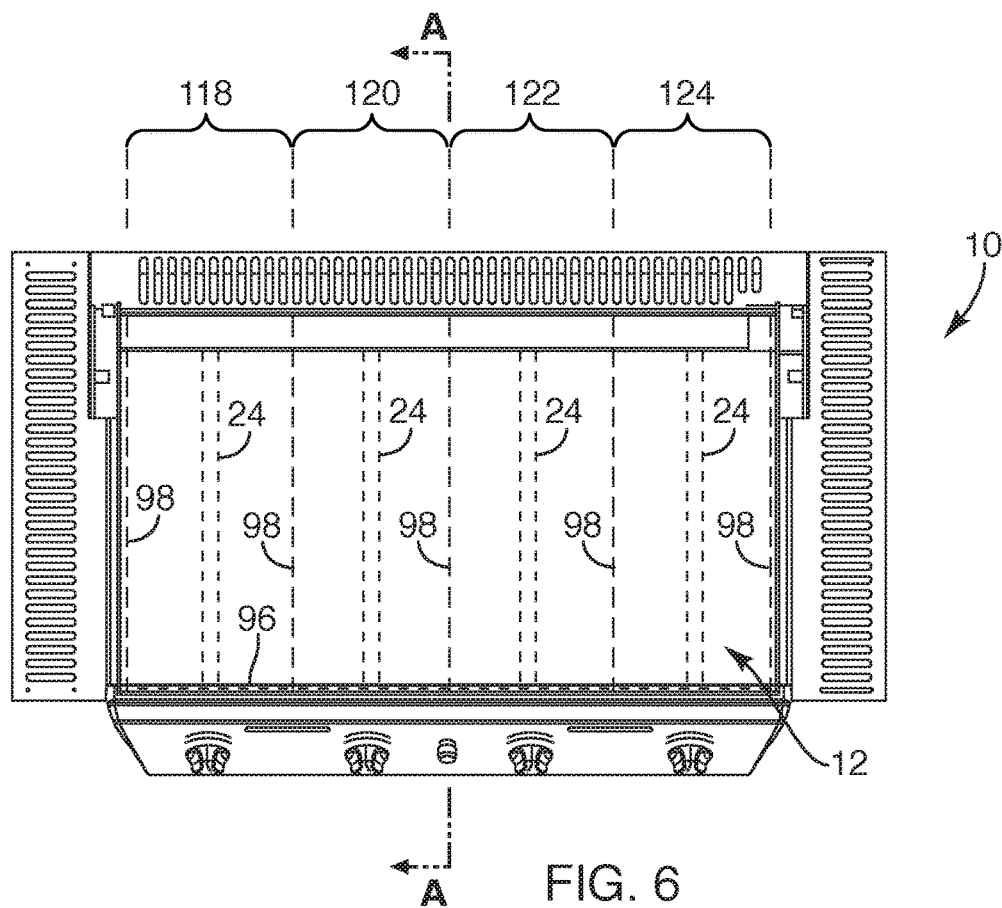
FIG. 6 is a top view of the cooking station with the griddle, depicting heating regions and burners in dashed lines, according to another embodiment of the present invention.
Figure 6A:
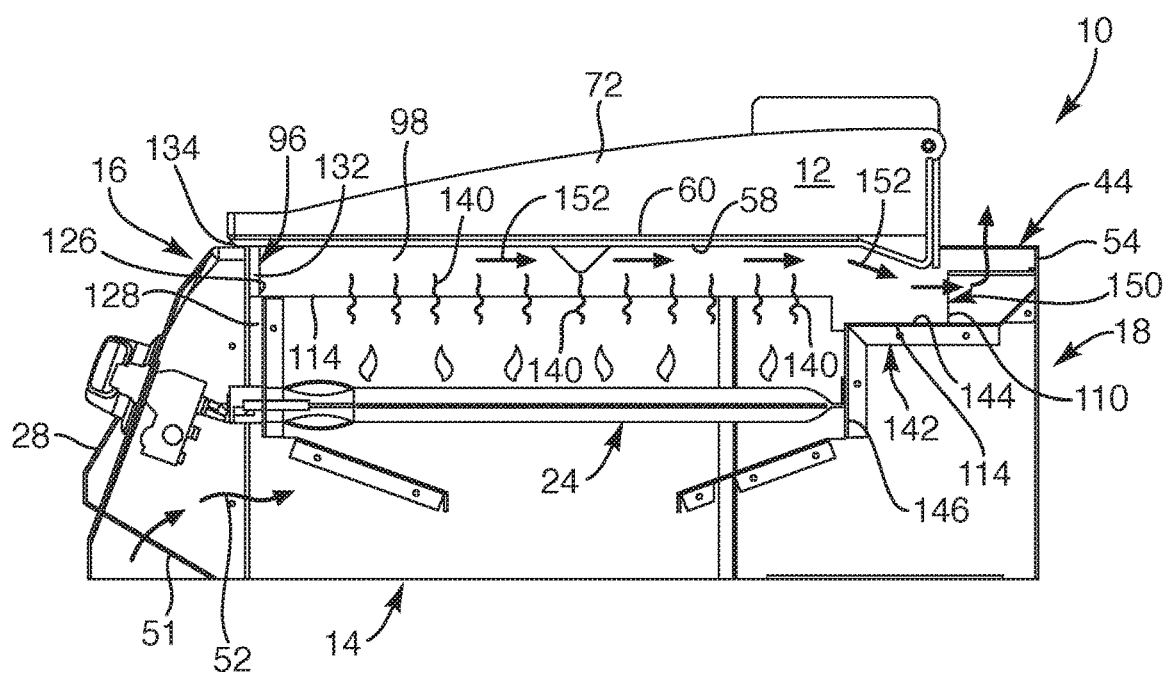
FIG. 6A is a cross-sectional side view of the cooking station taken along section line A-A in FIG. 6, depicting one burner convectively heating a single region of the griddle and movement of convection heat toward a rear side of the cooking station, according to another embodiment of the present invention.

Now with reference to FIGS. 4, 6 and 7, the lateral ribs 98 may extend from the front rib 96 in an evenly spaced relationship relative to each other so as to define multiple heating regions of the griddle 12 on the cooking station 10. In other words, each heating region of the underside surface 58 of the griddle 12 may be defined between adjacently extending lateral ribs 98. Further, each heating region may be defined between the front rib 96 and the rear end 90 of the underside surface 58 between adjacently extending lateral ribs 98. As depicted, the heating regions defined by the adjacently extending lateral ribs 98 each include one burner 24 positioned below each heating region, the front rib 96, lateral ribs 98 and burners 24 depicted with dashed lines in FIG. 6. In one embodiment, as depicted, the griddle 12 may define multiple heating regions, for example, a first region 118, a second region 120, a third region 122, and a fourth region 124, each region including a single burner 24 aligned and centered below a corresponding heating region. In another embodiment, there may be multiple burners 24 associated with a single heating region. In this manner, one or more burners 24 may be sized and configured to exclusively provide convective heat to a defined heating region.

With respect to FIG. 6A, the griddle 12 may be positioned, at least partially, within the frame 14 of the cooking station 10. In one embodiment, the front rib 96 and lateral ribs 98 of the griddle 12 may fit snug within the frame 14 of the cooking station 10 in an integrated manner, the cooking surface 60 and splash guards 72 of the griddle 12 disposed above the frame 14. For example, the front lower edge 104 (see FIG. 4) of the front rib 96 may be positioned on a ledge 126 of a front extension 128 extending along the front side 16 of the frame 14 with an outer surface 130 (see FIG. 4) of the front rib 96 abutting against an inward facing front frame surface 132. Further, the front end 88 (FIG. 4) of the underside surface 58 of the griddle 12 may sit flat against an upward facing front frame surface 134 of the frame 14. In this manner, the front rib 96 along with the front end 88 of the griddle 12 cooperates with the front side 16 of the frame 14 in an integrated manner to substantially block and prevent convection heat 140 escaping from the front side 16 of the frame 14 and griddle 12.

With respect to FIGS. 2, 5 and 6A, as previously set forth, the lateral ribs 98 of the griddle 12 may at least partially fit within the frame 14 of the griddle 12. For example, an outer surface 136 of the lateral ribs 98 at the most left and right sides of the griddle 12 may fit snug relative to an inner surface of the respective left and right sides 20, 22 of the frame 14. Further, the frame 14 may include a rear frame portion 142 with a horizontal component 144 and a vertical component 146, each of which may extend between left and right sides 20, 22 of the frame 14 along a rear side 18 of the frame 14. The vertical component 146 may be employed to couple one end of each of the burners 24 thereto. The horizontal component 144 of the rear frame portion 142 may be sized and configured to support and receive the lower edge 114 adjacent the second end 110 of each of the lateral ribs 98.

Figure 9:
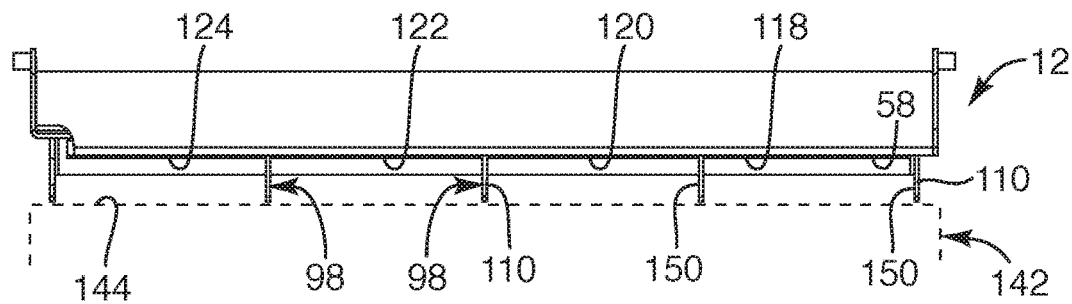
FIG. 9 is a rear view of the griddle, depicting a rear frame portion in dashed lines, according to another embodiment of the present invention.
Figure 10:
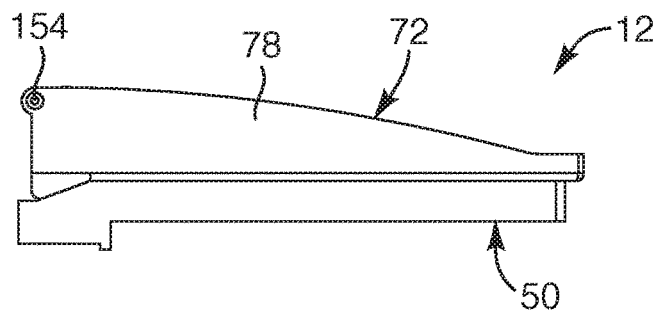
FIG. 10 is a left side view of the griddle, according to the present invention.
Figure 11:
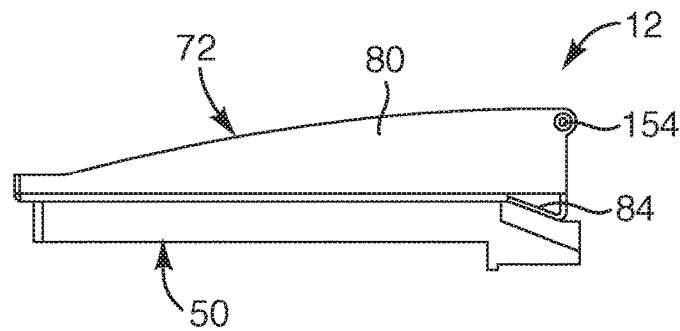
FIG. 11 is a right side view of the griddle, depicting a through hole at an end of the trough, according to another embodiment of the present invention.
Figure 12:
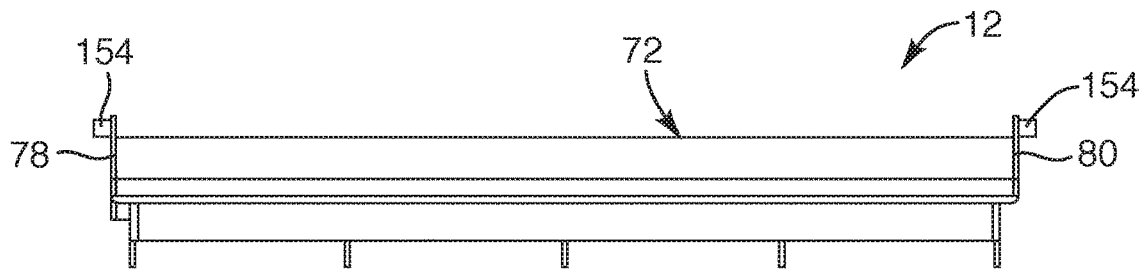
FIG. 12 is a front view of the griddle, according to another embodiment of the present invention.

Referring to FIGS. 6A and 9, with the lower edge 114 adjacent the second end 110 of each of the lateral ribs 98 positioned directly on the horizontal component 144, such arrangement provides multiple openings 150 or passageways above the horizontal component 144 that each correspond with adjacently extending lateral ribs 98. In other words, each opening 150 or passageway is defined between the second ends 110 of the adjacently extending lateral ribs 98 and the rear end 90 of the underside surface 58 of the griddle 12 and the horizontal component 144 of the rear frame portion 142. Such opening 150 or passageway provides a path of least resistance for convection heat 140 to flow such that the opening 150 is configured to draw convection heat 140 from the space between the adjacently extending lateral ribs 98. In this manner, there are multiple openings 150 or passageways provided at the rear side of the griddle 12, each of which are similarly defined between each of the second ends 110 of the adjacently extending lateral ribs 98 that corresponds with one of the first, second, third, and fourth heating regions 118, 120, 122, and 124. Further, in another embodiment, the openings 150 or passageways are not limited to a fully bound or closed loop opening 150, but may extend and be defined as an inverted u-shape or channel shape (without the horizontal component 144), as depicted in FIG. 9.

Now with reference to FIGS. 6 and 6A, applying convection heat 140 to one of the heating regions with one of the burners 24, will now be described. With the burner 24 positioned directly below, for example, the second heating region 120 and, upon the burner 24 being ignited, convection heat 140 rises to the underside surface 58 of the griddle 12 along the second heating region 120. Due to the height of the ribbing structure 50 (FIG. 5), a space or volume between the lateral ribs 98 fills with convection heat 140, thereby convectively heating the second heating region 120. As this space fills, the convection heat 140 is drawn toward the rear side of the griddle 12 as indicated by arrow 152, the path of least resistance due to there not being a rib structure extending along the length 82 (FIG. 8) of the rear end 90 of the griddle 12, but rather, a passage or opening 150 (see also FIG. 9) between the second ends 110 of the adjacently extending lateral ribs 98 that draws the convection heat 140 therethrough before bellowing over the lower edge 114 of the lateral ribs 98 to adjacent heating regions, such as the first and third heating regions 118, 122. In this manner, each of the lateral ribs 98 extend downward a distance or height from the underside surface 58 of the griddle 12 so that convection heat 140 may only heat the particular region or second heating region 120 associated with the burner 24 and is funneled toward the rear end 90 of the underside surface 58 of the griddle 12 through the opening 150.

With respect to FIGS. 1, 10, 11 and 12, the left splash guard 78 and the right splash guard 80 of the griddle 12 may include a hinge component 154. Such hinge component 154 may be sized and configured to cooperate with a cover 15 or lid of the cooking station 10. In this manner, the cover 15 may be pivotably coupled to the griddle 12. In another embodiment, the cover 15 may be pivotably coupled to the frame 14. Further, the frame 14 may include finger shields 156 extending upward on a left side 20 and right side 22 of the frame 14. Such finger shields 156 may extend upward and adjacent to the hinge component 154 of the splash guards 72 to minimize potential pinching of a user's fingers proximate the pivoting point between the cover 15 and the splash guards 72.

The frame 14 of the cooking station 10 and griddle 12 may be formed of metallic materials. For example, various components of the frame 14 may be formed of various steel materials, such as stainless steel or the like, formed with paneling, extensions, cross-members, or any other suitable frame components, and may be coupled together with typical fasteners and/or bolts and the like. The griddle 12 may also be formed from metallic materials, such as, carbon steel, cast iron, stainless steel, or aluminum, or various metal alloys, or any other suitable cooking surface material known in the art, such as porcelain coated materials. The metallic materials may be manufactured using cold rolled steel processes, or hot rolled steel techniques, or any other known manufacturing process, such as casting or stamping, as known in the art. The various plate components of the griddle 12 may include a thickness of 5-6 millimeters, but is not so limited, as such thickness of the various components of the griddle may range, for example, between 4-10 millimeters. Further, the ribbing structure 50 may be formed with typical metal cutting techniques and processes and coupled to the underside surface of the griddle 12 with known techniques, such as welding. Also, portions of the griddle 12, such as the trough 84 and splash guards 72 may be formed by employing cutting and bending techniques from sheet or plate material to form the griddle 12 as well as forming portions to the of the griddle 12 with welding techniques, or employing any other known process or techniques to form the griddle 12, as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking system, comprising:
   a frame extending with a front side, a rear side, a left side, and a right side each extending between a lower portion and an upper portion;
   multiple burners coupled to and extending between the front side and the rear side of the frame; and
   a griddle sized to be suspended by the frame to be positioned on the upper portion of the frame, the griddle having a cooking surface and an underside surface, the underside surface extending to define a rectangular shape with a front end, a rear end, a left end, and a right end, the griddle including a front rib and multiple lateral ribs, the front rib extending along the front end of the underside surface, and the multiple lateral ribs extending along the underside surface from the front rib to the rear end of the underside surface, the multiple lateral ribs being spaced from each other so as to define multiple heating regions such that each heating region is defined between adjacently extending lateral ribs, each of the heating regions includes one of the multiple burners positioned below one of the multiple heating regions, each of the lateral ribs extend downward from the underside surface a height so as to funnel convection heat from any one of the multiple burners toward the rear end of the underside surface of the griddle and from the rear side of the frame;
   wherein the front rib and the multiple lateral ribs are integrally formed with the underside surface of the griddle; and
   wherein the multiple lateral ribs directly extend from the underside surface of the griddle such that each lateral rib is spaced and separate from an adjacent lateral rib.

2. The cooking system of claim 1, wherein the front rib substantially blocks convection heat from escaping from the front side of the frame.

3. The cooking system of claim 1, wherein the adjacently extending lateral ribs are sized to substantially prevent convection heat from moving over the adjacently extending lateral ribs and directly, convectively heating adjacent heating regions.

4. The cooking system of claim 1, wherein the adjacently extending lateral ribs are sized to substantially maintain convection heat between the adjacently extending lateral ribs to only convectively heat the corresponding heating region between the adjacently extending lateral ribs.

5. The cooking system of claim 1, wherein the cooking surface of the griddle comprises a trough configured to catch grease, the trough extending only along a rear end surface of the cooking surface.

6. The cooking system of claim 1, wherein the frame comprises an air intake system configured to feed air to the multiple burners, the air intake system including at least one of a front vent along the front side of the frame, a left vent along the left side of the frame, and a right vent along a right side of the frame.

7. The cooking system of claim 1, wherein the front rib and the lateral ribs facilitate channeling convection heat to a rear side of the frame.

8. The cooking system of claim 1, wherein the cooking surface of the griddle comprises a trough configured to catch grease, the trough extending only along a rear end surface of the cooking surface and defining an opening at one end of the trough.

9. The cooking system of claim 8, wherein the opening defined in the trough is configured to deposit grease within a vent box coupled to the frame, the vent box including venting for air intake to feed air to the multiple burners.

10. A griddle configured to control convection heat from one or more gas flame burners of a cooking station, the griddle comprising:
a cooking surface having a rectangular shape, the cooking surface configured to face upward;
an underside surface, the underside surface extending to generally correspond with the cooking surface, the underside surface facing in an opposite direction than the cooking surface, the underside surface extending to define a periphery with a front end, a rear end, a left end, and a right end;
a front rib having a front rib height and coupled to the front end of the underside surface, the front rib extending longitudinally along the front end of the underside surface; and
multiple lateral ribs each extending laterally relative to the front rib and extending along the underside surface from the front rib to the rear end of the underside surface, the multiple lateral ribs being spaced from each other so as to define multiple heating regions such that each heating region is defined between adjacently extending lateral ribs, the heating regions each configured to be positioned above a gas flame burner, each of the lateral ribs extend downward from the underside surface a lateral rib height such that the adjacently extending lateral ribs are configured to funnel the convection heat from the gas flame burner toward the rear end of the underside surface and away from a rear side of the cooking station;
wherein the front rib and the multiple lateral ribs are integrally formed with the underside surface; and
wherein the multiple lateral ribs directly extend from the underside surface such that each lateral rib is spaced and separate from an adjacent lateral rib.

11. The griddle of claim 10, wherein the front rib substantially blocks the convection heat from escaping a front side of the underside surface.

12. The griddle of claim 10, wherein the adjacently extending lateral ribs are sized to substantially prevent convection heat from moving over the adjacently extending lateral ribs and directly, convectively heating adjacent heating regions.

13. The griddle of claim 10, wherein the adjacently extending lateral ribs are sized to substantially maintain convection heat therebetween to only convectively heat the corresponding heating region between the adjacently extending lateral ribs.

14. The griddle of claim 10, wherein the cooking surface comprises a trough configured to collect grease, the trough extending only along a rear end surface of the cooking surface, the trough defining a through hole configured to funnel grease therethrough.

15. The griddle of claim 10, further comprising a splash guard extending upward above a periphery of the cooking surface.

16. The griddle of claim 15, wherein the splash guard includes a hinge structure, the hinge structure configured to pivotably couple to a cover of the cooking station.

17. A method for selectively heating regions of a griddle with convection heat from one or more gas flame burners of an outdoor cooking station, the method comprising:
turning on one or more gas burners of the outdoor cooking station such that the one or more gas burners are positioned below an underside surface of a griddle; and
selectively heating specific regions of the griddle that correspond with the one or more gas burners turned on, the specific regions each defined by adjacently extending parallel ribs, the ribs extending laterally from a front rib toward a rear end of the underside surface of the griddle such that the front rib and the parallel ribs channel convection heat to flow between the adjacently extending parallel ribs toward the rear end of the griddle and away from the outdoor cooking station, the front rib and the parallel ribs integrally formed with the underside surface of the griddle, and the parallel ribs directly extend from the underside surface of the griddle such that each parallel rib is spaced and separate from an adjacently extending parallel rib.

18. The method according to claim 17, wherein the selectively heating comprises selectively heating the specific regions with the parallel ribs substantially preventing convection heat from moving over the parallel ribs by the convection heat being drawn toward the rear end of the griddle.

19. The method according to claim 17, wherein the selectively heating comprises blocking the convection heat from moving toward a front end of the underside of the griddle with a downward facing edge of the front rib resting on a frame of the outdoor cooking station to substantially block the convection heat from escaping out the front side of the cooking station.

20. The method according to claim 17, wherein the selectively heating comprises substantially preventing convection heat from moving over the parallel ribs by drawing the convection heat toward the rear end of the griddle with rear end openings, each rear end opening defined by oppositely positioned rear rib ends of the parallel ribs and the rear end of the underside surface of the griddle and a frame component of the outdoor cooking station, the parallel ribs positioned on the frame component.

* * * * *